No. 804,368. PATENTED NOV. 14, 1905.
W. F. BEASLEY.
RESILIENT TIRE.
APPLICATION FILED DEC. 15, 1902. RENEWED JAN. 9, 1904.
2 SHEETS—SHEET 1.
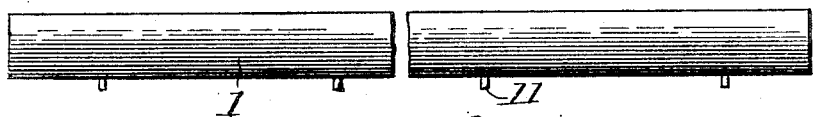
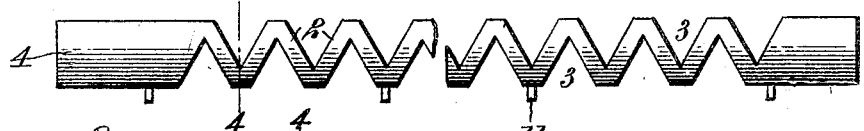
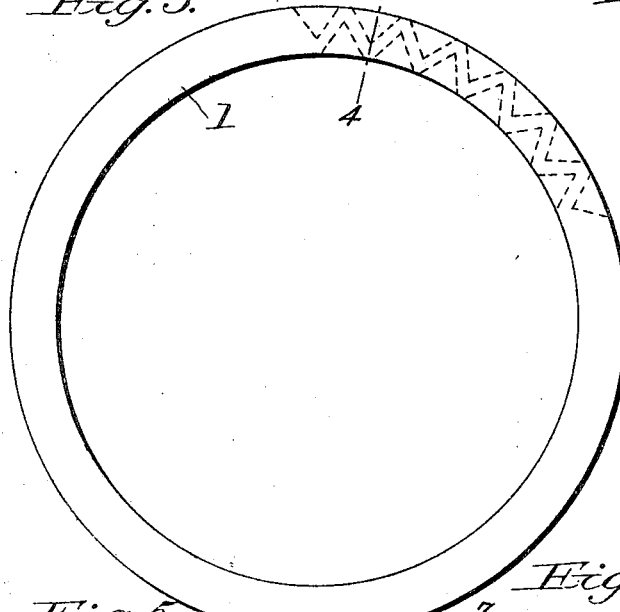
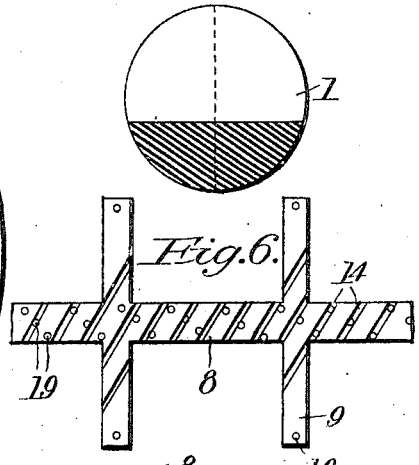

No. 804,368. PATENTED NOV. 14, 1905.
W. F. BEASLEY.
RESILIENT TIRE.
APPLICATION FILED DEC. 15, 1902. RENEWED JAN. 9, 1904.

2 SHEETS—SHEET 2.

Witnesses
Inventor
William F. Beasley
By
his Attorney

UNITED STATES PATENT OFFICE.

WILLIAM F. BEASLEY, OF PLYMOUTH, NORTH CAROLINA.

RESILIENT TIRE.

No. 804,368.      Specification of Letters Patent.      Patented Nov. 14, 1905.

Application filed December 15, 1902. Renewed January 9, 1904. Serial No. 188,405.

*To all whom it may concern:*

Be it known that I, WILLIAM F. BEASLEY, a citizen of the United States of America, and a resident of Plymouth, county of Washington, State of North Carolina, have invented certain new and useful Improvements in Resilient Tires, of which the following is a specification.

My invention relates to certain new and useful improvements in resilient tires for vehicles; and it consists in a tire having a central resilient section or core composed of transverse walls arranged as oppositely-inclined secants to the wheel, whereby a truss construction is formed, the core being formed by open wedge-shaped notches. This core is strengthened by strips following the sinuousities of its surface and adhering to the outer and inner faces of the sinuous truss-walls and is protected against being cut by a reticulated armor-band extending circumferentially around its tread portion and secured in place by perforated ears engaging studs on the inner face of the core. Suitable wrappings and a wearing-surface are also provided.

My invention further consists in the construction, arrangement, and combination of the several parts of which it is composed, as will be hereinafter more fully described and claimed.

Figure 9:
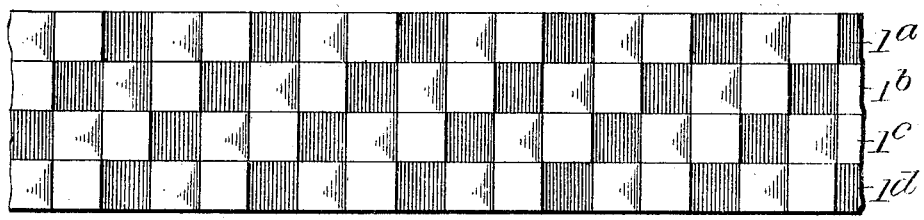
Figure 10:
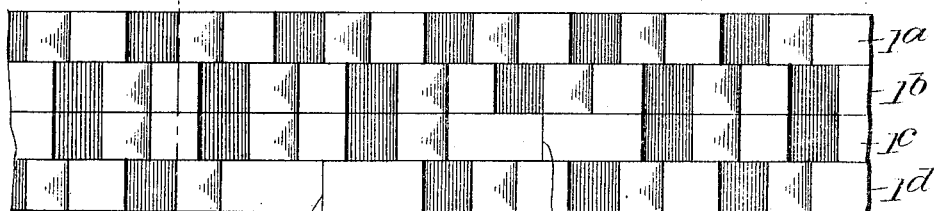
Figure 11:
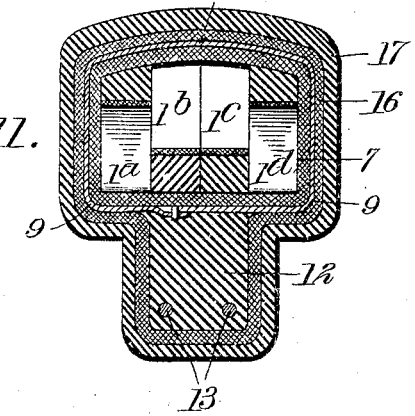
Figure 12:
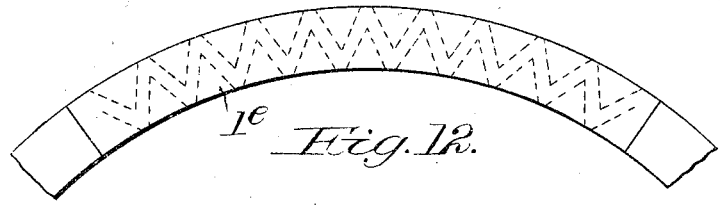

Referring to the accompanying drawings, in which corresponding parts are designated by like marks of reference, Figure 1 is a side elevation of a cylindroid from which a straight core may be formed according to this invention. Fig. 2 is a similar view of a core having the sinuous truss-walls formed therein. Fig. 3 is a view of an annulus from which an annular core according to this invention may be constructed. Fig. 4 is a cross-section taken on lines 4 4 of either Figs. 2 or 3. Fig. 5 is a side elevation, partly in section, of a part of a tire constructed in accordance with this invention. Fig. 6 is a plan view of the armor-band. Fig. 7 is a cross-section on lines 7 7 of Fig. 5. Fig. 8 is a detail, partly in section, illustrating means by which the ends of a straight tire may be secured together to form the annulus. Fig. 9 is a detail view illustrating a form of tire adapted for heavy vehicles. Fig. 10 is a modification thereof. Fig. 11 is a section on line 11 11 of Fig. 10. Fig. 12 is a side elevation of a core, each section of which is composed of a plurality of sectors.

My improved tire (shown in Figs. 1 to 8) consists of a core forming a resilient section, a base, a strengthening-wrapper, and means for securing it in place upon the wheel, which, in so far as they are permanently connected to the tire, form parts thereof.

The resilient section proper is a body, shown as a cover 1, consisting of a series of transverse walls 2, and preferably being secants to the rim upon which the tire is to be applied, adjacent walls being oppositely inclined, whereby the inner end of each transverse wall abuts against the inner end of the adjacent wall on one side and its outer end abuts against the outer end of the adjacent wall on the other side, the core being thus in the form of a sinuous band compressing the transverse wall. Such a section may be obtained by forming in a suitable mold a cylindroid of rubber of the desired cross-section and contour, as shown in Fig. 1, and cutting in the opposite faces thereof wedge-shaped notches 3, the notches in one face being staggered in respect to the notches in the opposite face, whereby between the adjacent notches the transverse trussed walls 2 will be left. (See Fig. 2.) As the straight cylindroid thus formed must be bent into an annulus to form the completed tube, whereby the inner or rim face of the tire will be compressed and the outer or tread face stretched, I prefer to make the notches in the outer face of the straight cylinder of less width and the notches in the inner faces of the core of greater width than the desired width of the corresponding notches in the core, whereby the strains to which the core is subjected in bending the tire around the wheel will render the inner and outer notches of the desired width.

For the purpose of affording solid portions of the full cross-section of the core to permit a convenient and efficient joint to be made between the end of the core I prefer to leave a portion 4 at each end of the core unnotched.

Instead of molding the tire in a straight cylindroid it may be molded directly into an annulus of the desired cross-section and contour (see Fig. 3) and have the notches cut from the outer and inner surface thereof, (shown in dotted lines, Fig. 3,) or the core may be molded to its finished shape—that is to say, in the shape of an annulus with outer and inner notches.

In either of the above methods of forming the core it is, for reasons to be hereinafter set forth, only partially vulcanized in the molds in which it is shaped.

Instead of making the core of a single cylindroid piece it might, if desired, be made in two halves, each half consisting of a substantially D-shaped cross-section, and the flat face of the two halves brought together in the plane of revolution of the tire, as is shown in dotted lines in Fig. 4.

The completed core formed in any of the ways before described may now have strips of canvas 5 and 6 or cloth impregnated with vulcanized rubber and having strands of rubber worked therein laid on its outer and inner faces, respectively, and pressed down into the notches 3, so as to lie close to the truss-walls 2, to which they will be firmly united by the subsequent process of vulcanization, whereby the said walls may be greatly stiffened and strengthened, the superimposed canvas taking up the strain caused by the deformation of the walls when under pressure.

Around the core, whether provided or not with the strips 5 and 6, is spirally wound a tape 7, of canvas, having unvulcanized rubber therein, and upon the tread-face of the core over the tape 7 is laid a resilient band 8. By preference this band is made of a compressed textile or a thin sheet metal—say spring-brass—of a width about equal to the bearing-surface of the completed tire when carrying the load for which it is designed, the band having ears 9 projecting at intervals from opposite sides thereof, the opposite ears being of sufficient length to together encircle the wrapped core and having their ends perforated, as at 10, to be passed over and engage studs 11, worked into the wrapped core at corresponding intervals, the ends of which project through the tape wrapping at the inner face of the tire. Such a band (a plan view of a portion of which is shown in Fig. 6) will not only afford an armor against a cutting of the tire, but will serve to distribute strain over a number of the trussed walls.

Upon the rim side of the armored and wrapped core is laid a continuous base 12 of partially-vulcanized rubber composition, having embedded therein a belt 13 of metal ribbon wire or wires. The core and base are secured together by wrapping them with a cord $13^a$, passing therearound and over the band 8, which may be spirally corrugated, as at 14, to hold the cord wrapping against displacement, and the tire is completed by putting on an outer wrapping 16 of canvas and a rubber covering 17. The wrapping of cord $13^a$ and of canvas 16 securely tie the base to the core and permit the use of the latter as a means of holding the tire upon the wheel, for which purpose eyelets 18 are inserted through the wrapping 16 and the base to receive bolts, as will be hereinafter described. The cord wrapping $13^a$ may be dispensed with, if desired, and by preference the band 8 is reticulated, as at 19, whereby the canvas wrappings between which it is placed come in contact through the perforations 19 and are thus the more securely united.

The several parts of the tire assembled as above described are placed in a suitable mold and subjected to the process of vulcanization. As the core and base, the central parts of the tire, were partially vulcanized before being assembled, their vulcanization will be completed at about the time the wrappings are vulcanized, thus avoiding the necessity of killing the outer parts of the tire by overvulcanization to properly vulcanize the inner parts thereof, which has heretofore been a defect. This is avoided by vulcanizing the several parts of the tire before they are assembled in an inverse ratio to the distance of the parts from the surface of the completed tire. I consider this partial vulcanization before the tire is assembled of the inner portions thereof to an extent sufficient to cause their vulcanization to be completed simultaneously with the vulcanization of the outer portions of the tire to be a marked advance in the art and desire to claim this method as a part of my invention.

By the final vulcanization the several parts of the tire are securely united together, the armor-band preventing cutting of the tire and transmitting strains circumferentially around the tire, while the several wrappings hold the trussed walls of the core up to their work and receive the wear. As the casing is elastic, that portion thereof in contact with the ground is pressed toward the wheel-rim without any bodily displacement of the casing as a whole in respect to the wheel, such as would take place were the casing rigid, and thus the weight on the wheel is transmitted to and taken up by the truss-walls at the bottom of the wheel as compression strains and not as tensile strains by the truss-walls at the top of the wheel. As the rubber has a much greater limit of elasticity under the former (compressive strains) than under the latter, (tensile strains,) this use of truss-walls as compression members resulting from the employment therewith of an elastic casing is of great value. It will also be seen that the trussed core-section is formed independently of and separate from its casing, consisting merely of a series of trussed walls communicating only at the apices formed by the abutting of adjacent walls and entirely disconnected at their sides, and thus while embodying the principle of truss-compression members shown in my prior patent, No. 636,104, granted October 31, 1899, it constitutes an advance over the construction shown therein in that the core strip may be more cheaply formed, (its manufacture being independent of that of any wrappings or inclosures therefor,) in that it may be, if desired, stamped from sheet-rubber or worked directly into form from vulcanized rubber merely by the use of molds of the most simple character.

The several wrappings and bands may be placed upon the core, and the core may be finally vulcanized either while it is straight and before it is bent into the annulus or after it has been bent. In the latter case it is completed and ready to be placed upon the rim; but in the former it is necessary to provide means for connecting the opposite ends of the straight tire together. While wheel-rims are known commercially as twenty-eight inches, thirty inches, &c., these numberings only approximately express their diameter, as rims of the same number differ among themselves between somewhat wide limits and require tires of corresponding different sizes. While I construct the straight cores in lengths adapted for rims of the several commercial sizes, as such rims differ among themselves, it is necessary to provide means whereby the tire may be cut down to accurately fit the rim upon which it may be desired to mount it. This I accomplish by making the core of such a length as will permit it to fit the largest rim of the number for which it is designed and by forming upon each end of the core an unnotched or solid end 4 of such length that when the tire is cut down to fit the smallest rim of the number for which it is designed an unnotched or solid portion will be left at each end thereof, which solid portions may be secured together in any of the well-known ways of securing the ends of a solid tire. In Fig. 8 I have shown an improved means for this purpose consisting in cutting a recess 20 in each of the solid end portions of the tire and placing in the cavity formed thereby when the two ends are brought together the head 21 of a bolt 22, the head having a concave under surface forming biting edges 23, which engage the material of each end of the tire, and more especially the wires located in the base. The bolt projects between the ends of the tire and through the rim 24 of the wheel, on the inner side of which it receives a nut 25, by which the head may be drawn to clamp the tire.

The rim preferably used with my improved tire has a central channel 26 to receive the base of the tire and covered wing-walls 27 on each side thereof, which receive the inner face of the tire on each side of the base and carry the thrust therefrom, the tire being held against turning on the rim by bolts 28 passing through the latter and through the eyelets 18 in the base.

If the core be molded directly into circular form, it will of course be understood that the solid end portions above described will not be present nor will they be necessary, while if the core be either molded in circular form or molded straight and joined in circular form before the several strips, bands, and wrappings are put thereon and before final vulcanization the above-described bolt for joining the ends of the tire will be unnecessary, as the wrappings and bands will securely hold the tire together, and when the tire is completed in annular form before being applied to a wheel I prefer to divide the rim thereof in the plane of revolution, as shown in dotted lines in Fig. 7, whereby one-half may be removed for the purpose of inserting the tire and then be replaced and held by the bolts 28.

In Figs. 9 to 11 I have shown a tire especially adapted for heavy vehicles and containing many of the features before described. The tire here shown has a substantially flat tread instead of being cylindroid, as before described, and is formed out of a core of one or more rectangular bars of rubber notched as before described. By preference, as shown, I form the core of such a tire out of four separate bars $1^a$, $1^b$, $1^c$, and $1^d$, the bars being so arranged that the notches 3 into the outer bars $1^a$ and $1^d$ are staggered in respect to the notches in the medial bars $1^b$ and $1^c$, as shown, and the medial bars may be arranged either to have their notches staggered with each other, as in Fig. 9, or to coincide, as shown in Fig. 10, although I prefer the latter arrangement, as thereby the trussed walls 2 of the two medial sections being sufficiently braced by the wrapping 7, $13^a$, and 16, similar to those before described, the two medial sections $1^b$ and $1^c$ may be made deeper than the side sections, whereby a slightly-curved tread-face will be given to the tire, and if the several sections are made in any other form than that of completed annuli they may be so assembled that they break joint with the adjacent sections, as shown at 29 29 of Fig. 11, whereby the sections may be assembled into an annulus of practically the same strength as if formed from a continuous ring. Moreover, each section may, if desired, consist of a number of sectors $1^e$, the sectors breaking joint around the tire. A core made as above described may of course be wrapped and strengthened by strips and bands and be formed with a base for securing and be secured upon a rim, in the manner before described in connection with Figs. 1 to 8, and I have in Fig. 11 applied the reference-numerals to designate parts corresponding to parts previously designated thereby.

Having thus described my invention, what I claim, and desire to secure by Letters Patent, is—

1. A resilient core for a tire consisting of a sinuous band of rubber having an independently and separately formed strengthening-wrapping vulcanized therearound, the truss-walls formed in the band being unconnected at their sides except by the independently and separately formed wrapping, substantially as described.

2. A resilient core for a tire consisting of a sinuous band of rubber having strengthening-strips secured to its inner and outer faces and following the sinuosities thereof, substantially as described.

3. A resilient core for a tire consisting of a cylindroid having open wedge-shaped notches formed in its inner and outer surfaces and staggered in respect to each other.

4. A tire consisting of a resilient core formed of a sinuous band of rubber having strengthening-strips secured to its inner and outer faces and following the sinuosities thereof, and a strengthening-wrapping around the core, substantially as described.

5. A resilient tire consisting of a core formed of a sinuous band of rubber, a reticulated armored band circumferentially surrounding the core, and having ears for securing it in place, and a wearing-face inclosing the core and armor-band, substantially as described.

6. A resilient tire consisting of a sinuous core, a wrapping surrounding the core, a base having a continuous metallic band upon the inside of the core and a wearing-surface surrounding the core and base and securing the parts together, substantially as described.

7. A resilient tire consisting of a sinuous core, a wrapping surrounding the core, a reticulated and spirally-corrugated armor-band circumferentially surrounding the core and having ears for securing it in place, a base having continuous metallic bands upon the inside of the core, a spiral cord wrapping encircling the base and core, and held against displacement by the corrugations on the armor-band, and a wearing-surface surrounding the core and base, substantially as described.

8. As a new article of manufacture, a resilient core for an elastic tire, consisting of a sinuous band of rubber, formed by a series of trussed compression members or walls, the said walls being united at their abutting ends, and being unconnected at their sides, substantially as described.

9. As a new article of manufacture, a resilient core for an elastic casing consisting of a body-section having open wedge-shaped notches formed in its outer and inner surfaces, staggered in respect to each other, forming a series of trussed compression members in the body, substantially as described.

10. A tire consisting of a resilient core formed of a sinuous band of rubber and an independently and separately formed cover inclosing the resilient core thus formed, the trussed walls formed in the band being unconnected at their sides, except by the independently and separately formed cover, substantially as described.

11. A tire consisting of a resilient core formed of a sinuous band of rubber having strengthening-strips secured to its inner and outer faces and following the sinuosities thereof, and a wearing-section surrounding the resilient core thus formed, substantially as described.

12. A tire having a metallic band therein, in combination with means for securing the ends of the tire together, said means consisting of a clamping-bolt provided with a head having a concave under surface forming biting edges, adapted to engage the ends of the metallic band when brought together in placing the tire on the wheel, substantially as described.

13. A resilient core for a tire, consisting of a sinuous band of rubber, having a strengthening textile strip forming a part of the core and following the sinuosities thereof, substantially as described.

Signed at Washington, District of Columbia, this 15th day of November, 1902.

WILLIAM F. BEASLEY.

Witnesses:
 VERNON M. DORSEY,
 EDWARD P. HUGHES.